G. C. Bidwell.
Domestic Boiler.

Nº 36,501. Patented Sep. 23, 1862.

Witnesses:
W. H. Goddard
Decatur Holbert

Inventor;
Geo. C. Bidwell
Daniel Breed Atty

UNITED STATES PATENT OFFICE.

GEORGE C. BIDWELL, OF PHILADELPHIA, PENNSYLVANIA.

BOILER.

Specification of Letters Patent No. 36,501, dated September 23, 1862.

*To all whom it may concern:*

Be it known that I, GEO. C. BIDWELL, of Philadelphia, in the county of Philadelphia and State of Pennsylvania, have invented a new and useful Improvement in Steam-Kettles for Confectioners and Others; and I do hereby declare that the following is a full and exact description thereof, reference being had to the accompanying drawings and to the letters of reference marked thereon.

My invention consists of a double bottomed, steam generating safety kettle adapted to use over common stoves and furnaces, the same being portable or removable from the fire like common kettles.

Figure 1:
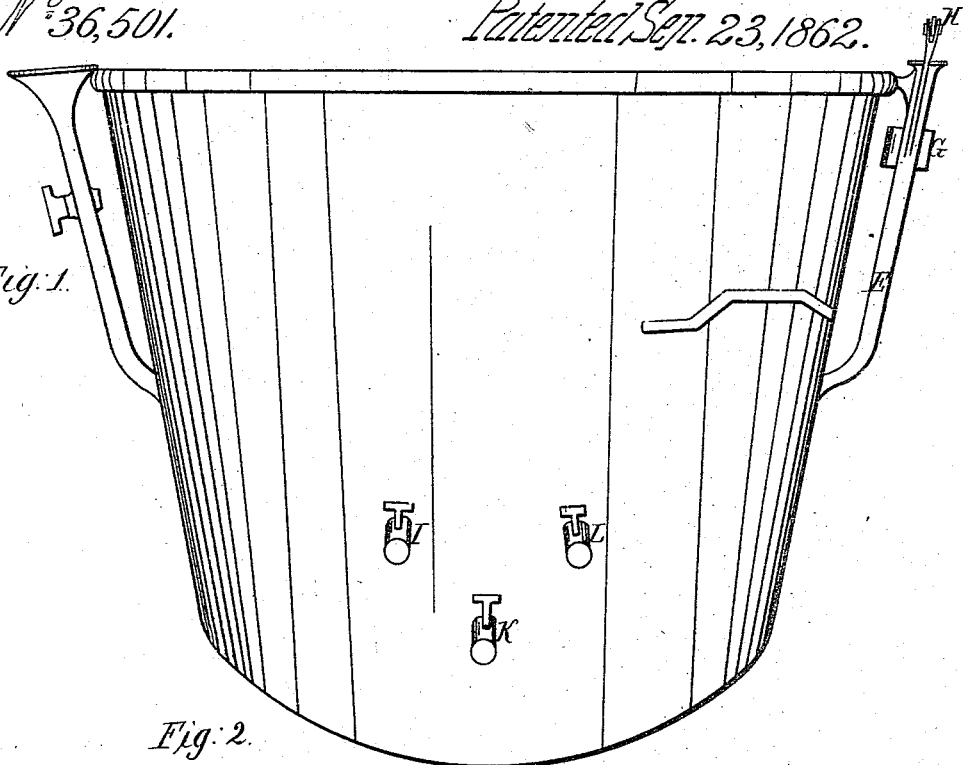
Figure 2:
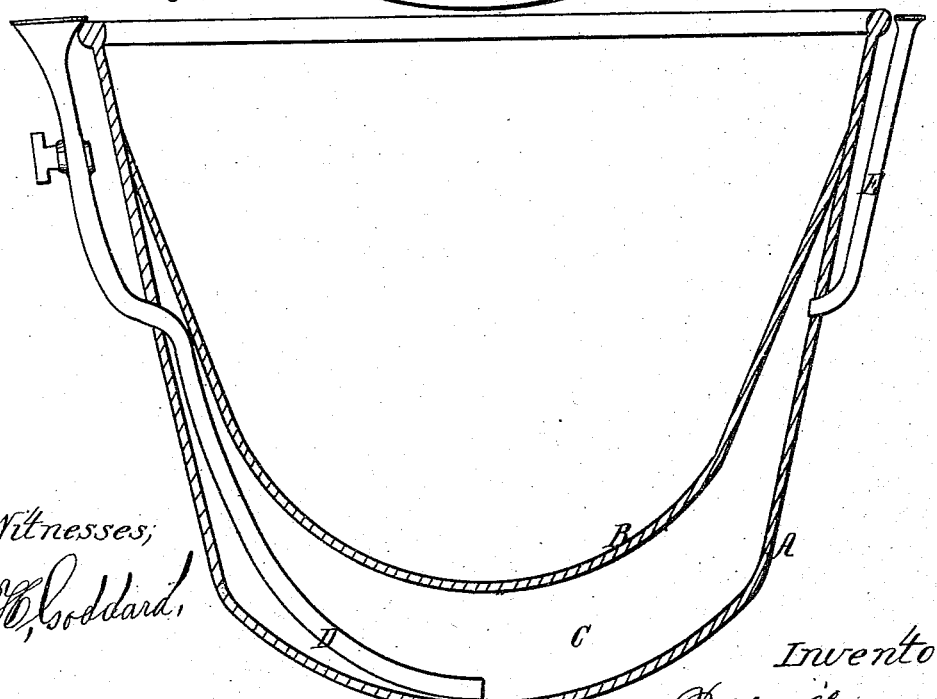

In the accompanying drawings Figure 1 is a front view of my improved kettle. Fig. 2 is a vertical section of the same.

The kettle is made with a double bottom as shown in Fig. 2, A, representing the outer or main kettle and B, the inner, there being a space C, between the two bottoms for water and steam.

The kettle may be made of copper, the inner portion B, being riveted to the main kettle A, say about three inches from the top.

Inserted into one side of the kettle is a tube D, crowned with a funnel and provided with a stop cock, for supplying water to the space C, between the two bottoms of the kettle. The kettle is also provided with a tube E, into which is inserted a steam safety-valve which is held by a weight G. This weight may be made lighter or heavier by adjusting the weight upon its lever H, in the usual manner. The two stop cocks I, and K, are intended for testing the height of the water in the space C, of the kettle. The cock I, is placed at the height of the inner bottom B, so as to enable the operator to test whether steam or water covers the lower side of bottom B, and to employ either water or superheated steam under the inner bottom of the kettle. The stop cock L, communicates with the lower part of space C, by means of a tube seen in dotted lines Fig. 1, so as to show when the water is nearly exhausted from the kettle. The kettle may have handles M, in the usual manner.

By the above construction I have supplied a great desideratum for confectioners and other manufacturers where both water and steam are required for heating, and where it is necessary to have the kettle easily removable from the fire and convenient for handling. This kettle is a complete combined water and steam, self-generating portable kettle.

I do not confine my invention to the precise arrangement of the various details of my kettle above described, but propose to vary these somewhat as the economy of construction, convenience and durability may demand. Yet I do not abandon such of the minor devices and specific arrangements as may be new in themselves and patentable in a separate application. Herein I especially embrace the combination of three features, portability, self-generating of steam and steam safety.

I am aware that steam has been employed in various ways with double kettles, but I believe that the above described portable steam kettle, for use on common stoves, is new and a great improvement over other inventions heretofore known.

Having thus fully described my invention what I claim and desire to secure by Letters Patent of the United States is:

The above described portable steam kettle as a new article of manufacture; the same being a steam-generating, double-bottomed kettle provided with safety valve substantially in the manner and for the purposes set forth.

GEORGE C. BIDWELL.

Witnesses:
DANIEL BREED,
EDM. F. BROWN.